US012767489B2

(12) United States Patent
Fan

(10) Patent No.: US 12,767,489 B2
(45) Date of Patent: Oct. 20, 2026

(54) MONITORING SYSTEM FOR PERSONNEL DELIVERY DEVICE AND PERSONNEL DELIVERY DEVICE

(71) Applicant: KONE Corporation, Helsinki (FI)

(72) Inventor: Jin Quan Fan, Jiangsu (CN)

(73) Assignee: KONE CORPORATION, Helsinki (FI)

( * ) Notice: Subject to any disclaimer, the term of this patent is extended or adjusted under 35 U.S.C. 154(b) by 314 days.

(21) Appl. No.: 18/587,041

(22) Filed: Feb. 26, 2024

(65) Prior Publication Data

US 2024/0228234 A1 Jul. 11, 2024

Related U.S. Application Data

(63) Continuation of application No. PCT/CN2022/107307, filed on Jul. 22, 2022.

(30) Foreign Application Priority Data

Aug. 27, 2021 (CN) ......................... 202110994724.2

(51) Int. Cl.
*B66B 25/00* (2006.01)
*G03B 17/56* (2021.01)

(52) U.S. Cl.
CPC .......... *B66B 25/006* (2013.01); *B66B 25/003* (2013.01); *G03B 17/561* (2013.01); *G03B 17/566* (2013.01)

(58) Field of Classification Search
CPC ... B66B 25/006; B66B 25/003; G03B 17/561; G03B 17/566
(Continued)

(56) References Cited

U.S. PATENT DOCUMENTS 9,952,485 B1 * 4/2018 Luski ................. F16M 11/2028
10,173,864 B2 * 1/2019 Hu .......................... B66B 23/20
(Continued)

FOREIGN PATENT DOCUMENTS

CN 1498849 A 5/2004
CN 103863934 A 6/2014
(Continued)

OTHER PUBLICATIONS

Chinese Office Action for Chinese Application No. 202110994724.2, dated May 28, 2025.
(Continued)

*Primary Examiner* — Gene O Crawford
*Assistant Examiner* — Lester Rushin, III
(74) *Attorney, Agent, or Firm* — Birch, Stewart, Kolasch & Birch, LLP

(57) ABSTRACT

A monitoring system for a personnel delivery device and the personnel delivery device are disclosed. The monitoring system includes a support member provided on the personnel delivery device and having an overhanging portion located above a personnel delivery unit; and a detection apparatus provided in the overhanging portion of the support member. The detection apparatus includes a first camera mounted in the overhanging portion; and a second camera mounted in the overhanging portion. The centerline of a lens of the first camera and the centerline of a lens of the second camera are symmetric with respect to the centerline of the personnel delivery unit of the personnel delivery device in the running direction.

20 Claims, 5 Drawing Sheets

11

1

(58) Field of Classification Search
USPC .......................................................... 198/322
See application file for complete search history.

(56) References Cited

U.S. PATENT DOCUMENTS

| | | | |
|---|---|---|---|
| 10,214,391 | B2 * | 2/2019 | Wang ...................... B66B 29/04 |
| 10,479,653 | B2 * | 11/2019 | Li ......................... B66B 29/005 |
| 11,254,545 | B2 * | 2/2022 | Juliana .................... B66B 25/00 |
| 2005/0088520 | A1 | 4/2005 | Wiesinger et al. |
| 2019/0047827 | A1 | 2/2019 | González Mieres et al. |
| 2019/0176201 | A1 | 6/2019 | Angerer et al. |
| 2021/0107771 | A1 | 4/2021 | Mendiolagoitia Juliana et al. |
| 2024/0228234 | A1 * | 7/2024 | Fan ....................... B66B 25/003 |

FOREIGN PATENT DOCUMENTS

| | | | | |
|---|---|---|---|---|
| CN | 205793042 | | * | 12/2016 |
| CN | 205793042 | U | * | 12/2016 |
| CN | 108698802 | A | | 10/2018 |
| CN | 208806912 | U | | 4/2019 |
| CN | 109715307 | A | | 5/2019 |
| CN | 208843550 | U | | 5/2019 |
| CN | 111741918 | | * | 10/2020 |
| CN | 211812976 | U | | 10/2020 |
| CN | 113572943 | A | | 10/2021 |
| JP | 2011-195288 | A | | 10/2011 |

OTHER PUBLICATIONS

International Search Report for PCT/CN2022/107307 mailed on Oct. 18, 2022.

* cited by examiner

MONITORING SYSTEM FOR PERSONNEL DELIVERY DEVICE AND PERSONNEL DELIVERY DEVICE

CROSS-REFERENCE TO RELATED APPLICATION

This application is a Continuation of PCT International Application No. PCT/CN2022/107307, filed on Jul. 22, 2022, which claims priority under 35 U.S.C. 119(a) to patent application No. 202110994724.2, filed in the China on Aug. 27, 2021, all of which are hereby expressly incorporated by reference into the present application.

TECHNICAL FIELD

The present disclosure relates to a monitoring system for a personnel delivery device and a personnel delivery device.

BACKGROUND

In personnel delivery device, such as escalators and moving sidewalks, it is necessary to set up a monitoring system to monitor the status of personnel delivery device. Generally speaking, the monitoring system includes a camera, and the position of the camera is greatly influenced by the building where the personnel delivery device is located, so it is often impossible for the camera to obtain the image of the personnel delivery device stably.

SUMMARY

Therefore, the present disclosure provides a monitoring system for a personnel delivery device, including: a support member, arranged on the personnel delivery device, wherein the support member is provided with a hanging part above a personnel delivery unit; a detection device, arranged in the hanging part of the support member, and including: a first camera, installed in the hanging part; a second camera, installed in the hanging part, a center line of a lens of the first camera and a center line of a lens of the second camera are symmetrical with respect to a center line of the personnel delivery unit of the personnel delivery device along a running direction.

Advantageously, the detection device further includes a fixing member arranged in the hanging part, and the first camera is pivotally installed to the fixing member through a first mounting seat and is able to pivot within a first predetermined angle range to adjust an observation range of the first camera.

Advantageously, the second camera is pivotally installed to the fixing member through a second mounting seat and is able to pivot within a second predetermined angle range to adjust an observation range of the second camera.

Advantageously, the observation range of the first camera and the observation range of the second camera partially overlap to form an overlapping area, and a height of the overlapping area in a vertical direction is greater than a height of an object to be observed.

Advantageously, the first camera and the second camera are configured such that an optical axis of the lens of the first camera and an optical axis of the lens of the second camera form an angle with each other.

Advantageously, the first camera and the second camera are configured such that the angle formed by the optical axis of the lens of the first camera and the optical axis of the lens of the second camera changes within a predetermined range through pivoting of the first camera and the second camera.

Advantageously, the angle formed by the optical axis of the lens of the first camera and the optical axis of the lens of the second camera varies from 30 degrees to 120 degrees.

Advantageously, the first mounting seat includes a first part and a second part, the first part is pivotally installed to the fixing member, and the first camera is fixedly installed to the second part, the first part forms a first angle with respect to a vertical axis perpendicular to a longitudinal axis of the fixing member, and the second part forms a second angle with respect to a vertical axis perpendicular to a longitudinal axis of the fixing member, and the first angle is greater than the second angle.

Advantageously, the first part of the first mounting seat includes a first through hole, and the fixing member is configured to pass through the first through hole, so that the first mounting seat is able to be pivotally installed to the fixing member.

Advantageously, a plurality of first grooves are arranged on the fixing member at a predetermined angle from each other, and a first elastic member is arranged in the first mounting seat, so that, upon the first mounting seat being installed to the fixing member, the first elastic member engages in one of the plurality of first grooves.

Advantageously, upon the first mounting seat pivoting relative to the fixing member, the first elastic member is disengaged from one of the plurality of first grooves and then engaged in another one of the plurality of first grooves, so that the first mounting seat is able to pivot within the first predetermined angle range.

Advantageously, the predetermined angle by which the plurality of first grooves are separated from each other is in a range of 10 to 15 degrees.

Advantageously, the first elastic member includes a first spring and a first ball, and the first spring and the first ball are configured such that the first spring biases the first ball to abut against one of the plurality of first grooves upon the first mounting seat being installed to the fixing member.

Advantageously, the second mounting seat includes a third part and a fourth part, the third part is pivotally installed to the fixing member, the second camera is fixedly installed to the fourth part, the third part forms a third angle with respect to a vertical axis perpendicular to a longitudinal axis of the fixing member, and the fourth part forms a fourth angle with respect to a vertical axis perpendicular to a longitudinal axis of the fixing member, and the third angle is greater than the fourth angle.

Advantageously, the third part of the second mounting seat includes a second through hole, and the fixing member is configured to pass through the second through hole, so that the second mounting seat is able to be pivotally installed to the fixing member.

Advantageously, a plurality of second grooves are arranged on the fixing member at a predetermined angle from each other, and a second elastic member is arranged in the second mounting seat, so that upon the second mounting seat being installed to the fixing member, the second elastic member is engaged in one of the plurality of second grooves.

Advantageously, upon the second mounting seat pivoting relative to the fixing member, the second elastic member is disengaged from one of the plurality of second grooves and then engaged in another one of the plurality of second grooves, so that the second mounting seat is able to pivot within the second predetermined angle range.

Advantageously, predetermined angle by which the plurality of second grooves are separated from each other is in a range of 10 to 15 degrees.

Advantageously, the second elastic member includes a second spring and a second ball, and the second spring and the second ball are configured such that the second spring biases the second ball to abut against one of the plurality of second grooves upon the second mounting seat being installed to the fixing member.

Advantageously, the hanging part of the support member includes a removable end cover, so that the detection device can be accessed upon the removable end cover being removed.

The present disclosure further provides a personnel delivery device, including the abovementioned monitoring system.

BRIEF DESCRIPTION OF DRAWINGS

The advantages and objectives of the present disclosure can be better understood in the following detailed description of preferred embodiments of the present disclosure with reference to the accompanying drawings. The drawings are not drawn to scale in order to better show the relationship between the components in the drawings. In the accompanying drawings.

DETAILED DESCRIPTION

Figure 1:
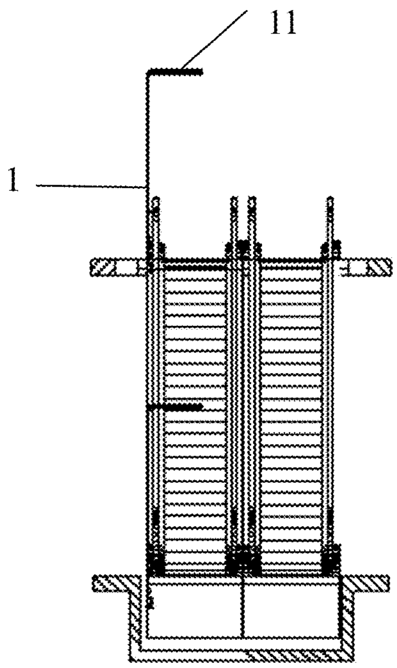
FIG. 1 shows a schematic view of a monitoring system for a personnel delivery device according to the present disclosure, in which a support member is installed to the personnel delivery device.

Various embodiments according to the present disclosure will be described in detail with reference to the accompanying drawings. Herein, it should be noted that in the drawings, the same reference numerals are given to components having basically the same or similar structures and functions, and repeated descriptions about them will be omitted. The term "including A, B, C, etc. in sequence" only indicates the arrangement order of included components A, B, C, etc., and does not exclude the possibility of including other components between A and B and/or between B and C.

The drawings in the present disclosure are schematic diagrams to help explain the concept of the present disclosure, and schematically show the shapes of various parts and their relationships.

Hereinafter, with reference to FIGS. 1 to 11, preferred embodiments according to the present disclosure will be described in detail.

The monitoring system according to the present disclosure is used for monitoring a personnel delivery device. In the following description, an escalator is taken as an example to describe the monitoring system, but those skilled in the art will understand that the monitoring system of the present disclosure can also be applied to other personnel delivery device, such as moving sidewalks.

Figure 2:
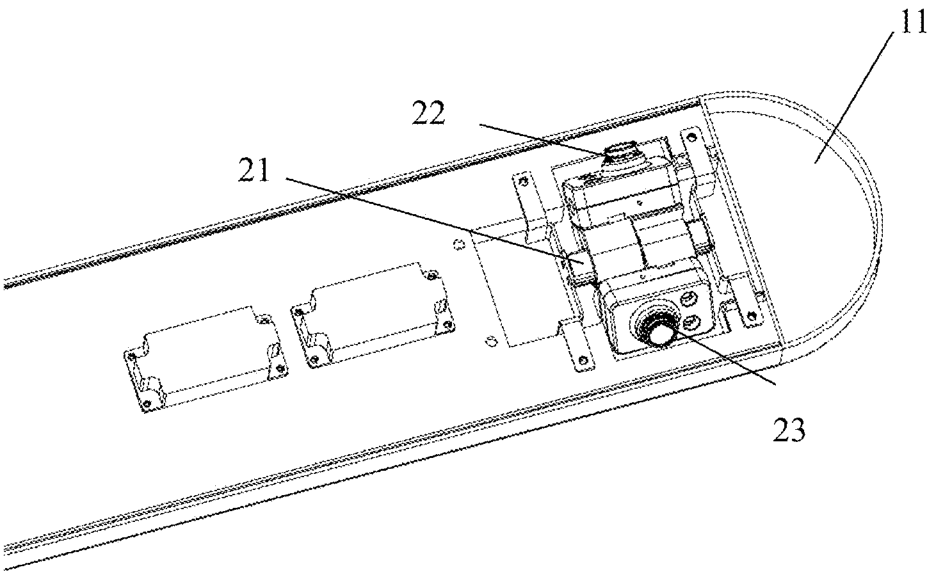
FIG. 2 shows a bottom view of a hanging part of a support member of the monitoring system.

The monitoring system includes a support member 1 and a detection device 2. The support member is arranged on the personnel delivery device, preferably between the guardrail and the outer edge of the personnel delivery device. The support member includes a hanging part 11 located above the step, and the detection device is arranged in the hanging part, as illustrated by FIGS. 1 and 2.

The detection device 2 includes a fixing member 21 installed in the hanging part; a first camera 22 and a second camera 23, both the first camera and the second camera are pivotally installed to the fixing member and are able to pivot around the fixing member. The first camera 22 is pivotally installed to the fixing member through a first mounting seat 24, so that, upon the first mounting seat 24 pivoting around the fixing member, the first camera 22 is driven to pivot within a first predetermined angle range to adjust an observation range of the first camera, and the first predetermined angle range can be selected as required. Similarly, the second camera is pivotally installed to the fixing member through the second mounting seat 25, so that upon the second mounting seat 25 pivoting around the fixing member, the second camera 23 is driven to pivot within a second predetermined angle range to adjust an observation range of the second camera, which can be selected as required.

The first camera and the second camera can be arranged in a front-back direction or in a left-right direction, which generally depends on the size of the cameras. In order to conveniently arrange cameras with different sizes, different arrangements are adopted. In this paper, "front-back direction" refers to a direction perpendicular to the longitudinal axis of the fixing member, and "left-right direction" refers to a direction parallel to the longitudinal axis of the fixing member.

The first camera and the second camera are configured such that an optical axis of a lens of the first camera and an optical axis of a lens of the second camera form an angle with each other, so that the first camera and the second camera are respectively arranged in the front-rear direction. Preferably, the optical axis of the lens of the first camera and the optical axis of the lens of the second camera are located on both sides of a vertical axis, preferably symmetrical to each other, the vertical axis may extend perpendicular to the hanging part.

Figure 5:
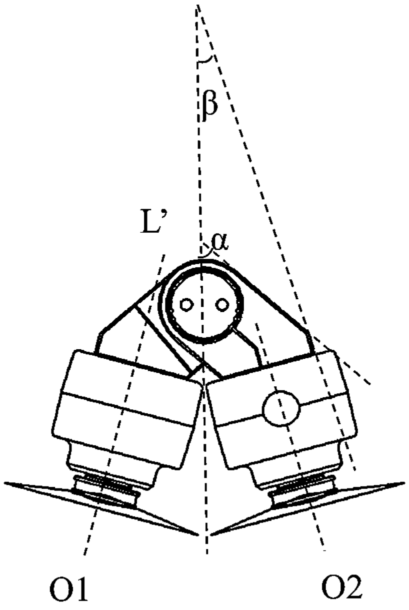
FIG. 5 shows a plan view in which a first camera and a second camera of a monitoring system are installed to a fixing member.
Figure 6:
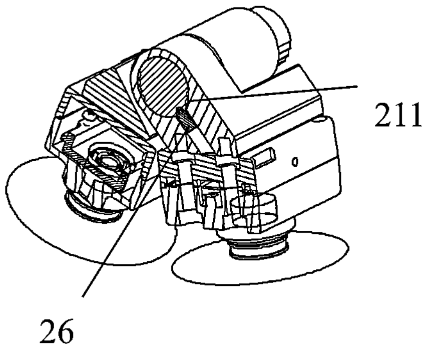
FIG. 6 shows a schematic diagram of an engagement between an elastic member and a fixing member of a detection device of a monitoring system.
Figure 7:
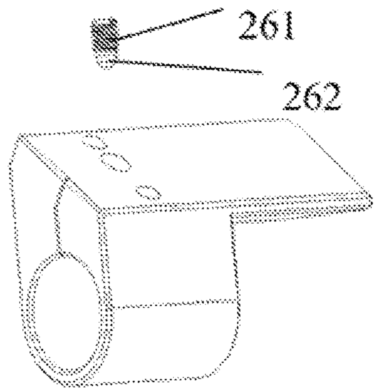
FIG. 7 shows an exploded view of an elastic member and a mounting seat of a detection device of a monitoring system.
Figure 8:
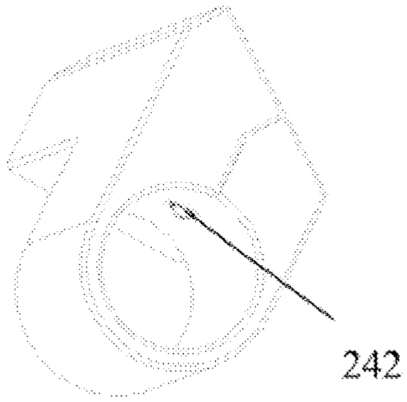
FIG. 8 is a schematic diagram showing that an elastic member of a detection device of a monitoring system is installed to a mounting seat.
Figure 9:
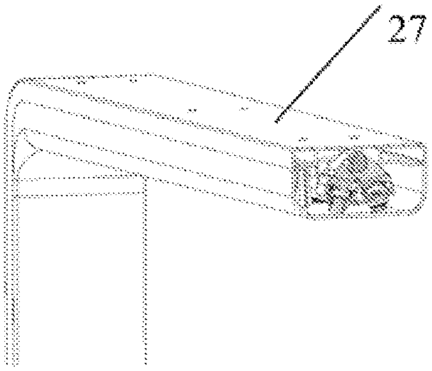
FIG. 9 is a schematic diagram showing the minimum angle between a first camera and a second camera of a detection device of a monitoring system.
Figure 10:
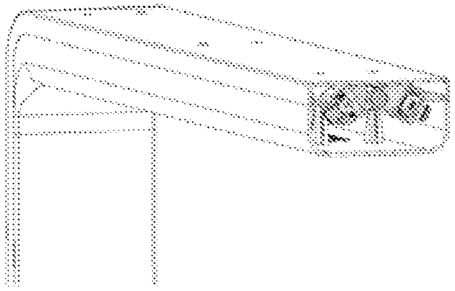
FIG. 10 is a schematic diagram showing the largest angle between a first camera and a second camera of a detection device of a monitoring system.
Figure 11:
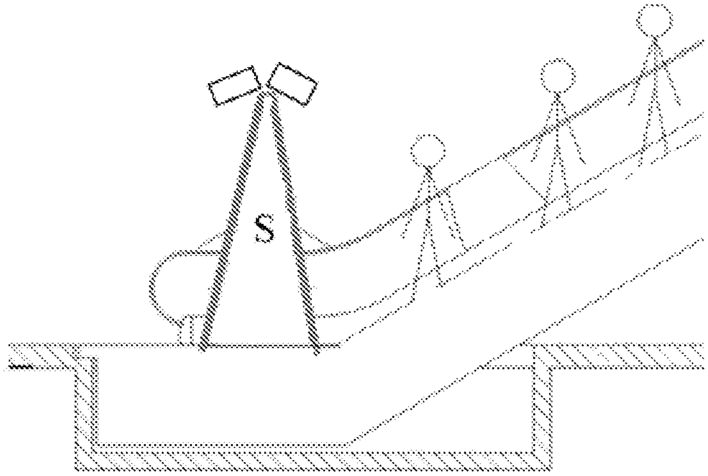
FIG. 11 shows an overlapping area of a first camera and a second camera.

Taking the fixing member as an example, as illustrated by FIG. 5, the first camera and the second camera are configured such that the optical axis O1 of the lens of the first camera and the optical axis O2 of the lens of the second camera are located on both sides of a vertical axis L' perpendicular to a longitudinal axis L of the fixing member, and both are inclined relative to the vertical axis L', so that the angle formed between the optical axis of the lens of the first camera and the optical axis of the lens of the second camera changes within a predetermined range through the pivoting of the first camera and the second camera. The "optical axis" should be understood as the center line of all light beams passing through the center of the camera lens. That is, the angle between the optical axis of the lens of the first camera and the optical axis of the lens of the second camera is at most 120 degrees (as illustrated by FIG. 11) and at least 30 degrees (as illustrated by FIG. 10). In the case that other fixing components are used instead of the fixing member, it will be understood by those skilled in the art that the arrangement of the first camera and the second camera can be changed as required, so that the optical axis of the lens of the first camera and the optical axis of the lens of the second camera can be arranged in the front-back direction respectively.

The observation range of the first camera and the observation range of the second camera partially overlap to form an overlapping area S, the height of the overlapping area in the vertical direction is greater than the height of the object to be observed, as schematically shown in FIG. 11.

Figure 3:
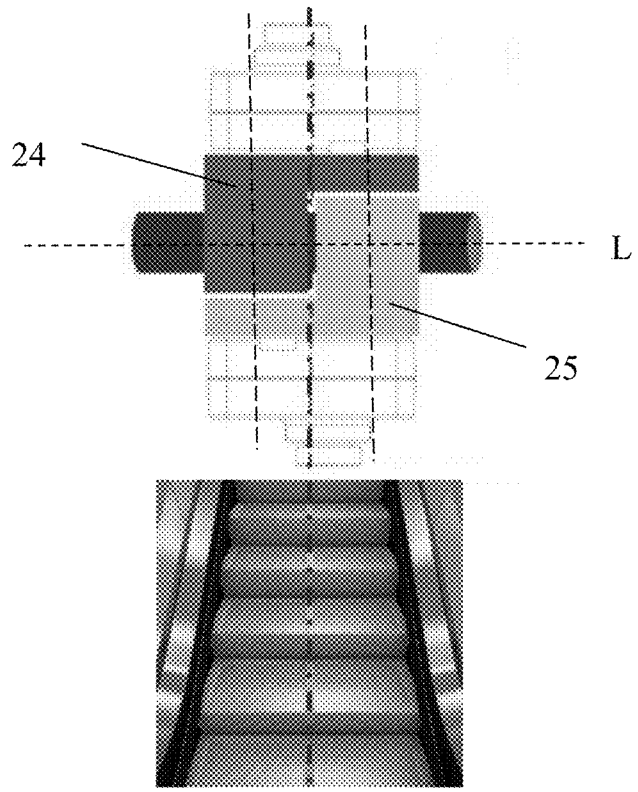
FIG. 3 shows a schematic diagram of center lines of a lens of a first camera and a lens of a second camera of the detection device of the monitoring system and a center line of the personnel delivery unit (e.g., step) of the personnel delivery device.
Figure 4:
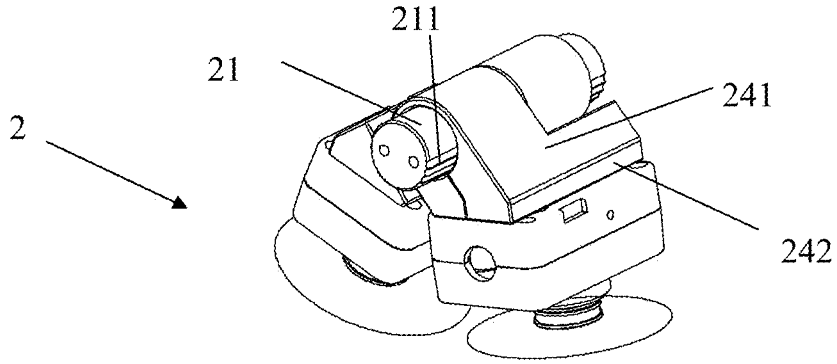
FIG. 4 shows a perspective view in which a first camera and a second camera of a monitoring system are installed to a fixing member.

Advantageously, as illustrated by FIG. 3, the center line of the lens of the first camera and the center line of the lens of the second camera are both symmetrical with the center line of the step along the running direction. Here, the "center line" should be understood as a line passing through the center of the camera lens in a plan view.

The first mounting seat 24 includes a first part 241 and a second part 242, and the first part 241 is pivotally installed to the fixing member 21, for example, the first part includes a first through hole, and the fixing member is configured to pass through the first through hole so that the first part is pivotally installed to the fixing member. The first camera 22 is fixedly installed to the second part 242, the first part forms a first angle α with respect to the vertical axis L' perpendicular to the longitudinal axis L of the fixing member, and the second part forms a second angle β with respect to the vertical axis perpendicular to the longitudinal axis L of the fixing member, and the first angle is greater than the second angle. In other words, the second part is more "steep" than the first part.

In order to pivot the first part (and thus the first camera) with respect to the fixing member, a plurality of first grooves 211 are provided on the fixing member, and a first elastic member 26 is provided in the first mounting seat 24, so that upon the first mounting seat being installed to the fixing member, the first elastic member 26 is engaged in one of the plurality of first grooves. In this way, upon an external force being applied to pivot the first camera, the first elastic member 26 can be disengaged from one of the plurality of first grooves and then engaged in another groove, and the plurality of first grooves are separated from each other by a predetermined angle (for example, in the range of 10 to 15 degrees), so that the first mounting seat is able to pivot within a first predetermined angle range. For example, the first elastic member 26 includes a first spring 261 and a first ball 262, which are configured such that the first spring biases the first ball to abut against one of a plurality of first grooves upon the first mounting seat being installed to the fixing member. The form of the first elastic member is not limited thereto, as long as its purpose can be achieved.

The way of pivoting the first part relative to the fixing member has been described above, and those skilled in the art should understand that the present disclosure is not limited to the above way, as long as the first camera is able to pivot relative to the fixing member within a predetermined range, which is within the scope of the present disclosure.

Similarly, the second mounting seat 25 includes a third part and a fourth part, and the third part is pivotally installed to the fixing member, for example, the third part includes a second through hole, and the fixing member is configured to pass through the second through hole so that the third part is pivotally installed to the fixing member. The second camera is fixedly installed to the fourth part, and the third part forms a third angle with respect to the vertical axis L' perpendicular to the longitudinal axis of the fixing member, and the fourth part forms a fourth angle with respect to the vertical axis perpendicular to the longitudinal axis of the fixing member, and the third angle is greater than the fourth angle. In other words, the fourth part is more "steep" than the third part.

Preferably, the third angle is the same as the first angle and the fourth angle is the same as the second angle. However, the third angle may be different from the first angle and the fourth angle may be different from the second angle.

In order to pivot the third part (and thus the second camera) with respect to the fixing member, a plurality of second grooves are provided on the fixing member, and the second elastic member is provided in the second mounting seat, so that, upon the second mounting seat being installed to the fixing member, the second elastic member engages in one of the plurality of second grooves. Thus, upon an external force being applied to pivot the second camera, the second elastic member can be disengaged from one of the plurality of second grooves and then engaged in the other groove, and the plurality of second grooves are separated from each other by a predetermined angle (for example, in the range of 10 to 15 degrees), so that the second mounting seat is able to pivot within a predetermined angle range. For example, the second elastic member includes a second spring and a second ball, which are configured such that the second spring biases the second ball to abut against one of the plurality of second grooves upon the second mounting seat being installed to the fixing member.

The way of pivoting the third part relative to the fixing member has been described above, and those skilled in the art should understand that the present disclosure is not limited to the above way, as long as the second camera is able to pivot relative to the fixing member within a predetermined range, which is within the scope of the present disclosure.

The second part of the first mounting seat is steeper than the first part, and the fourth part of the second mounting seat is steeper than the third part, so that the minimum angle (for example, 30 degrees) formed upon the first camera and the second camera pivoting is smaller than the angle (for example, 85 degrees) upon no mounting seat with this structure being not provided, so that a scene with a larger viewing angle can be obtained.

In order to easily access the first camera and the second camera in order to maintain them, the hanging part of the support member includes a removable end cover 27, so that the first camera and the second camera can be accessed upon the removable end cover being removed.

The above description is only an explanation of the present disclosure, which enables those skilled in the art to fully implement the scheme, but it is not a limitation of the present disclosure. The technical features disclosed above are not limited to the combination with other features, and those skilled in the art can also combine other technical features according to the purpose of the present disclosure, so as to achieve the purpose of the present disclosure.

The invention claimed is:

1. A monitoring system for a personnel delivery device, comprising:

a support member, arranged on the personnel delivery device, wherein the support member is provided with a hanging part above a personnel delivery unit; and a detection device, arranged in the hanging part of the support member, the detection device comprising:

a first camera, installed in the hanging part; and a second camera, installed in the hanging part, wherein, a center line of a lens of the first camera and a center line of a lens of the second camera are aligned with a center line of the personnel delivery unit of the personnel delivery device along a running direction.

2. The monitoring system according to claim 1, wherein the detection device further comprises a fixing member arranged in the hanging part, and wherein the first camera is pivotally installed to the fixing member through a first mounting seat and is able to pivot within a first predetermined angle range to adjust an observation range of the first camera.

3. The monitoring system according to claim 2, wherein the second camera is pivotally installed to the fixing member through a second mounting seat and is able to pivot within a second predetermined angle range to adjust an observation range of the second camera.

4. The monitoring system according to claim 1, wherein the observation range of the first camera and the observation range of the second camera partially overlap to form an overlapping area, and wherein a height of the overlapping area in a vertical direction is greater than a height of an object to be observed.

5. The monitoring system according to claim 1, wherein the first camera and the second camera are configured such that an optical axis of the lens of the first camera and an optical axis of the lens of the second camera form an angle with each other.

6. The monitoring system according to claim 5, wherein the first camera and the second camera are configured such that the angle formed by the optical axis of the lens of the first camera and the optical axis of the lens of the second camera changes within a predetermined range through pivoting of the first camera and the second camera.

7. The monitoring system according to claim 6, wherein the angle formed by the optical axis of the lens of the first camera and the optical axis of the lens of the second camera varies from 30 degrees to 120 degrees.

8. The monitoring system according to claim 2, wherein the first mounting seat comprises a first part and a second part, the first part being pivotally installed to the fixing member, wherein the first camera is fixedly installed to the second part, the first part forming a first angle with respect to a vertical axis perpendicular to a longitudinal axis of the fixing member, wherein the second part forms a second angle with respect to a vertical axis perpendicular to a longitudinal axis of the fixing member, and wherein the first angle is greater than the second angle.

9. The monitoring system according to claim 8, wherein the first part of the first mounting seat comprises a first through hole, and wherein the fixing member is configured to pass through the first through hole, so that the first mounting seat is able to be pivotally installed to the fixing member.

10. The monitoring system according to claim 2, wherein a plurality of first grooves are arranged on the fixing member at a predetermined angle from each other, and wherein a first elastic member is arranged in the first mounting seat, so that, upon the first mounting seat being installed to the fixing member, the first elastic member engages in one of the plurality of first grooves.

11. The monitoring system according to claim 10, wherein, upon the first mounting seat pivoting relative to the fixing member, the first elastic member is disengaged from one of the plurality of first grooves and then engaged in another one of the plurality of first grooves, so that the first mounting seat is able to pivot within the first predetermined angle range.

12. The monitoring system according to claim 10, wherein the predetermined angle by which the plurality of first grooves are separated from each other is in a range of 10 to 15 degrees.

13. The monitoring system according to claim 10, wherein the first elastic member comprises a first spring and a first ball, and wherein the first spring and the first ball are configured such that the first spring biases the first ball to abut against one of the plurality of first grooves upon the first mounting seat being installed to the fixing member.

14. The monitoring system according to claim 3, wherein the second mounting seat comprises a third part and a fourth part, the third part being pivotally installed to the fixing member, wherein the second camera is fixedly installed to the fourth part, the third part forming a third angle with respect to a vertical axis perpendicular to a longitudinal axis of the fixing member, wherein the fourth part forms a fourth angle with respect to a vertical axis perpendicular to a longitudinal axis of the fixing member, and wherein the third angle is greater than the fourth angle.

15. The monitoring system according to claim 14, wherein the third part of the second mounting seat comprises a second through hole, and wherein the fixing member is configured to pass through the second through hole, so that the second mounting seat is able to be pivotally installed to the fixing member.

16. The monitoring system according to claim 3, wherein a plurality of second grooves are arranged on the fixing member at a predetermined angle from each other, and wherein a second elastic member is arranged in the second mounting seat, so that upon the second mounting seat being installed to the fixing member, the second elastic member being engaged in one of the plurality of second grooves.

17. The monitoring system according to claim 16, wherein upon the second mounting seat pivoting relative to the fixing member, the second elastic member is disengaged from one of the plurality of second grooves and then engaged in another one of the plurality of second grooves, so that the second mounting seat is able to pivot within the second predetermined angle range.

18. The monitoring system according to claim 16, wherein the predetermined angle by which the plurality of second grooves are separated from each other is in a range of 10 to 15 degrees.

19. The monitoring system according to claim 16, wherein the second elastic member comprises a second spring and a second ball, and wherein the second spring and the second ball are configured such that the second spring biases the second ball to abut against one of the plurality of second grooves upon the second mounting seat being installed to the fixing member.

20. The monitoring system according to claim 1, wherein the hanging part of the support member comprises a removable end cover, so that the detection device can be accessed upon the removable end cover being removed.

* * * * *